United States Patent

Striplin

[15] 3,653,404
[45] Apr. 4, 1972

[54] CUT-OFF VALVE

[72] Inventor: Charles D. Striplin, Box 515, Benica, Calif. 94510

[22] Filed: July 14, 1970

[21] Appl. No.: 54,745

[52] U.S. Cl. .......................................... 137/512.3, 251/333
[51] Int. Cl. ............................... F16k 15/02, F16k 23/00
[58] Field of Search ............... 137/512.3, 244; 251/333, 120

[56] References Cited

UNITED STATES PATENTS

| 3,386,470 | 6/1968 | Goda | 251/333 |
| 2,511,494 | 6/1950 | Cohen | 137/512.3 |
| 1,621,179 | 3/1927 | Surlemont | 137/512.3 |

*Primary Examiner*—Samuel B. Rothberg
*Attorney*—Eckhoff and Hoppe

[57] ABSTRACT

A cut-off valve is provided for use on a pressurized line wherein pressure is applied to the line at intervals to dispense a fluid from the line. The valve of the present invention is in the nature of a check valve with a piston arrangement whereby as pressure is released from the line, the valve causes a negative pressure on the outlet, sucking back the last few drops, preventing dripping. The valve is particularly applicable to dispensing a viscous fluid such as glue.

2 Claims, 4 Drawing Figures

Patented April 4, 1972

3,653,404

INVENTOR.
CHARLES D. STRIPLIN
BY
ATTORNEYS

CUT-OFF VALVE

SUMMARY OF THE INVENTION

In many industrial operations such as applying glue to a piece of cardboard or the like, an automatic pulsing means is provided whereby as the board passes under the gluing device, a sensing device causes a flow of liquid through the line and when the article has passed under the gluing head, flow is shut off in some manner. The deficiency of such devices in the past has been that, although the flow from the line is cut off, there still remains liquid in the line which will continue to flow, for example by gravity, out of the line so that some dripping results. This not only wastes the liquid being dispensed, but in the case of glue or molasses, causes the machinery to become gummed up.

In accordance with the present invention, a valve in the nature of a check valve is provided so that if pressure is reduced on a line below a certain critical value, or if pressure is taken off altogether, the valve not only closes but also exerts a negative pressure on the outlet line pulling the last few drops of liquid into the valve body so that there is no drip between applications.

It is therefore an object of the present invention to provide a positive acting cut-off valve which will not only cut off the flow of fluid when the pressure in a line is shut off, or reduced below a certain critical value, but will also cause a negative pressure in the outlet, preventing drip.

Another object of the present invention is to provide a cut-off valve, of very simple structure that it is inexpensive to manufacture and is easy to take apart for cleaning or other maintenance.

DESCRIPTION OF THE PREFERRED EMBODIMENT

Figure 1:
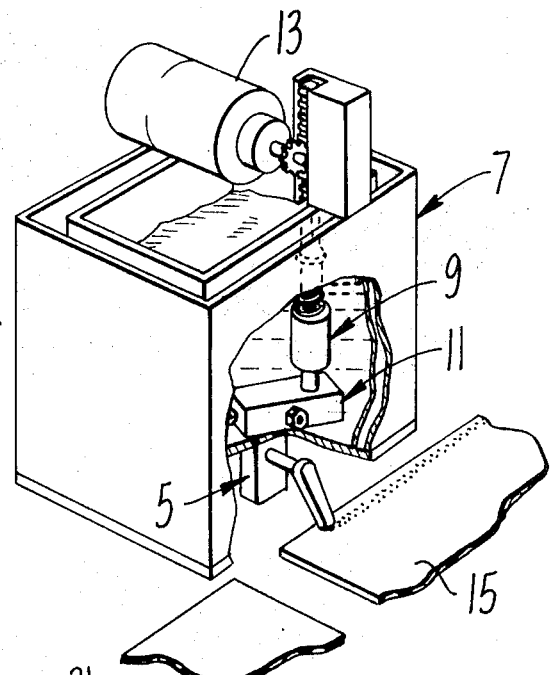
FIG. 1 is a perspective view of a cut-off valve embodying the present invention mounted in a glue tank.

Referring now to the drawing by reference characters, the valve of the present invention is generally designated 11 and is shown mounted in a double-walled glue pot 7. Ahead of the valve of the present invention is a pulsing cylinder 9, actuated by means 13, controlled by the passage of a board 15 under a dispensing head 5. These latter form no part of the present invention and will not be described in detail. Suffice it to say, that the piston member 9 periodically delivers glue under pressure to the cut-off valve 11 of the present invention.

The valve of the present invention, generally designated 11, has a body 17 having an inlet passage 19, leading to a central chamber 21 which has a first outlet 23 and a second outlet 25. The first outlet 23 includes a valve body 27, a seat 29, spring 31 and spring seat 33 forming a check valve structure generally designated 34. This check valve is normally held in the open position by the spring 31 so that fluid can flow in or out through the passage 35. However, if the pressure within the chamber 21 is increased beyond a critical value, the valve will close.

Adjacent to the central opening 21 is a cylindrical passage 37 having a shoulder 38 which leads to a conical portion 39 and thence to an enlarged portion 41 which is in fluid communication with the outlet 25. A piston 43, preferably having a sealing ring 45 thereon is mounted in the chamber 41 and is normally urged into the cylindrical portion 37 by means of spring 47.

Figure 2:
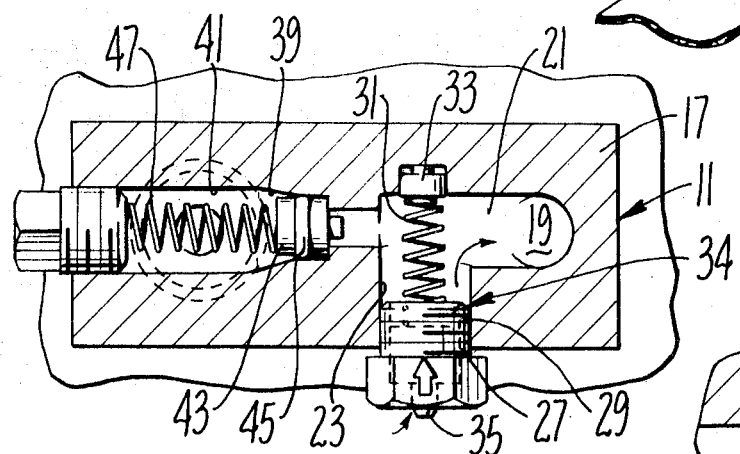
FIG. 2 is a plan view, partly in section of the valve of the present invention.
Figure 3:
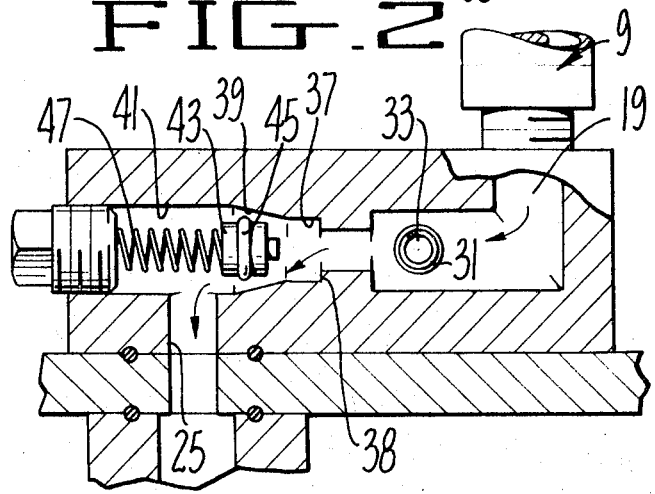
FIG. 3 is a side view in section of the valve of the present invention.
Figure 4:
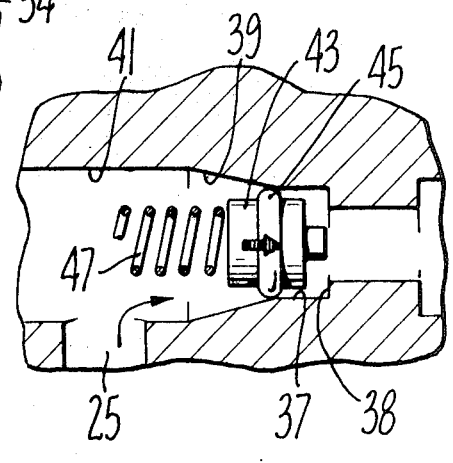
FIG. 4 is an enlarged partial view of the valve of the present invention showing it in a partially closed condition.

If there is no pressure on the line at 19, piston 43 is brought into sealing relationship with the passage 37, as is shown in FIG. 2, and the check valve 34 is open. Now if there is a sudden increase in pressure in the line 19, the piston 43 will be forced to the left, as is shown in FIG. 3, and at the same time the check valve 34 will close. In this position, liquid will flow freely out of the passage 25. If pressure is now reduced in the line 19, valve 34 will open and the piston 43 will move to the right by the action of the spring 47. As it gets to the junction of the cylindrical portion 37 and the conical portion 39, as is shown in FIG. 4, flow will be cut off. Now as the piston 43 continues to move to the right by action of the spring 47, the piston will engage the cylindrical portion and as it moves, exert a negative pressure on line 25, sucking back the last few drops of liquid. All the time the check valve 34 remains open since the flow is not great enough to cause it to close. In other words, a very gentle flow of liquid will not close the check valve but a sudden flow will so that a reverse flow through the check valve 34 is possible.

In the embodiment illustrated, the check valve was used since as the pressure is reduced in the line 19, it does not go to zero but the line is effectively shut off. Thus, without this check valve, the action of the piston would be blocked because of the incompressible fluid in the line. However, in many instances, the cut-off valve of the present invention could be used with a system wherein flow is not only cut off but the inlet is opened in such a manner that fluid could flow backward through it. In such an instance, only the piston actuated valve need be used and the check valve 34 could be eliminated.

It is believed apparent that I have provided a simple, cut-off valve which is automatic in operation and will remove the last few drops from the line so that there will be no dripping.

I claim:

1. An anti-drip cut-off valve having inlet and outlet lines and comprising in combination: will:
   a. a flow passage in said valve having a cylindrical configuration,
   b. an enlarged portion in the path of flow, on the discharge end of said cylindrical flow passage,
   c. the junction of said enlarged portion and said cylindrical portion forming a valve seat,
   d. a cylindrical piston in said enlarged portion and spring means normally urging said piston into contact with said valve seat and into said cylindrical portion,
   e. whereby pressure in said flow passage will normally keep said valve open and a release of pressure will
      1. first cause said piston to mate with said valve seat, cutting off flow and
      2. secondly cause said cylindrical piston to move through said cylindrical flow passage, causing a negative pressure in said line.

2. A cut-off valve in accordance with claim 1 wherein a check valve is provided ahead of the cut-off valve said check valve permitting a reverse flow of liquid under low pressure conditions and cutting off flow under high pressure conditions.

* * * * *